Aug. 17, 1965

P. KLAMP ETAL  3,200,767

SIGNAL SETTING MECHANISM FOR CONVEYOR TRUCK

Original Filed June 8, 1959  6 Sheets-Sheet 1

INVENTORS
PAUL KLAMP
BY JORGEN S. BILDSOE

ATTORNEYS

Aug. 17, 1965  P. KLAMP ETAL  3,200,767
SIGNAL SETTING MECHANISM FOR CONVEYOR TRUCK
Original Filed June 8, 1959  6 Sheets-Sheet 2
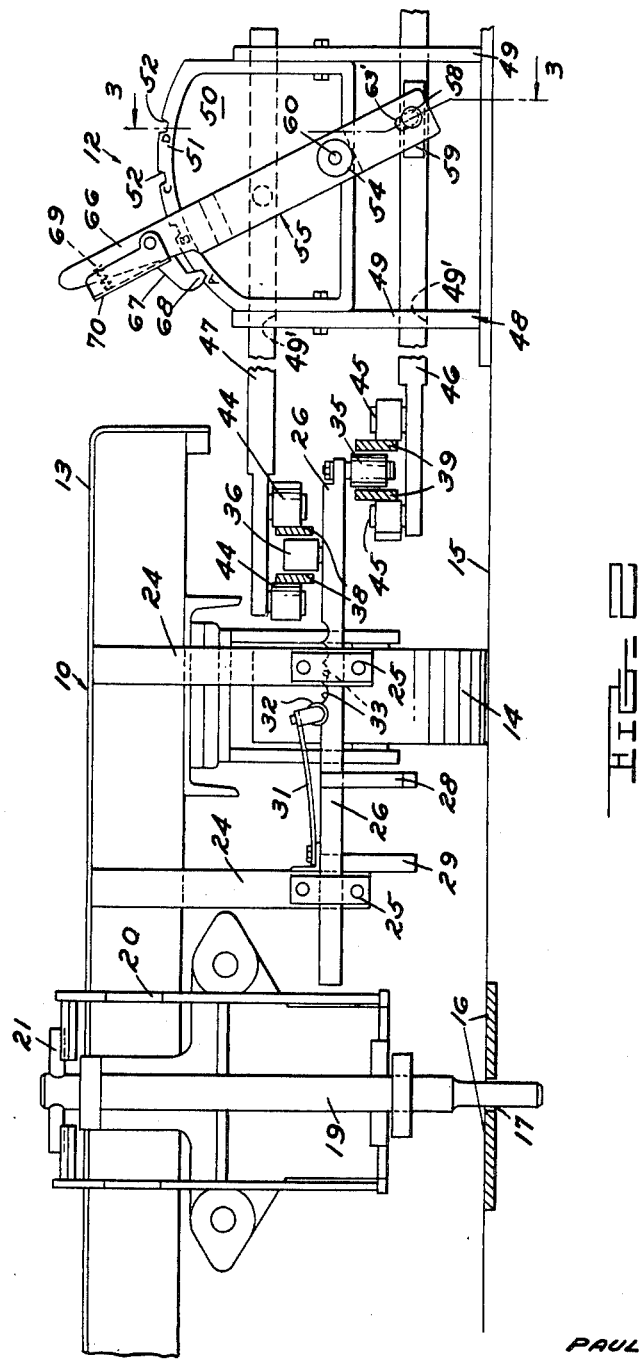
INVENTORS
PAUL KLAMP
JORGEN S. BILDSOE
BY
ATTORNEYS

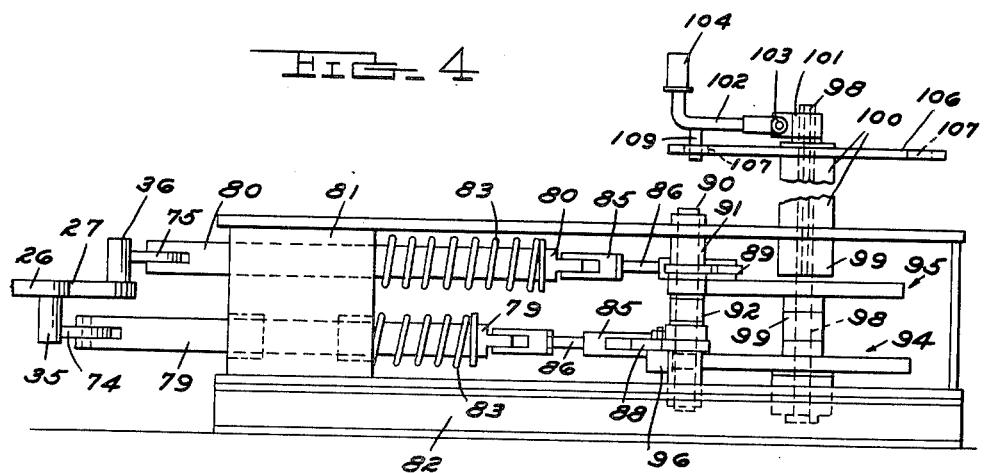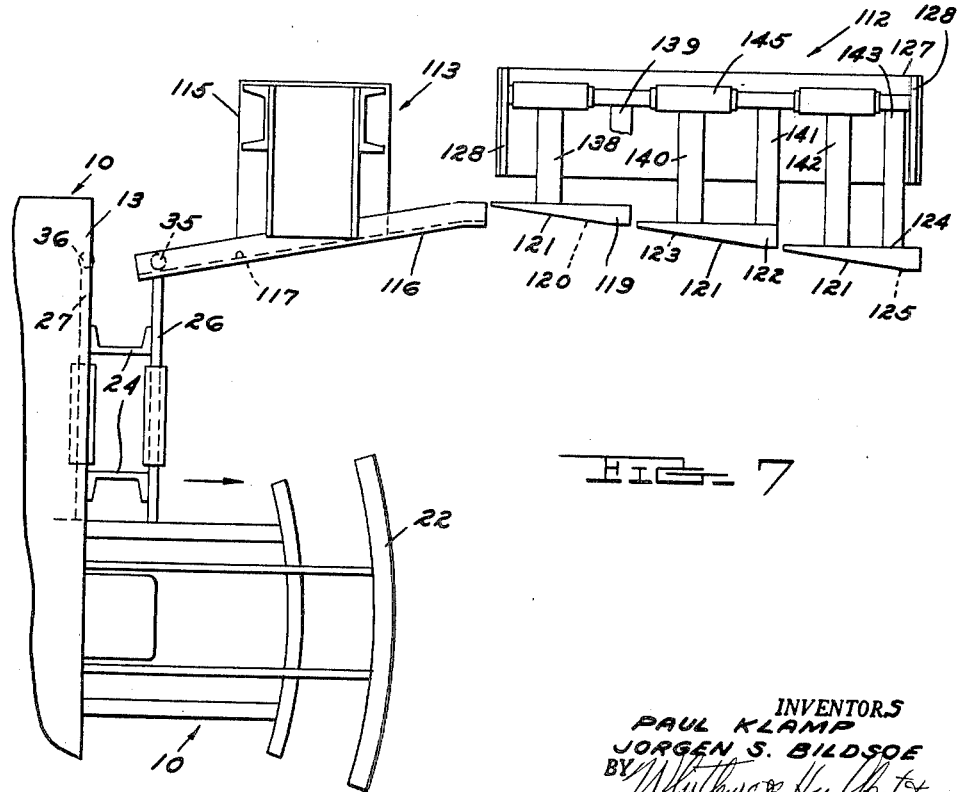

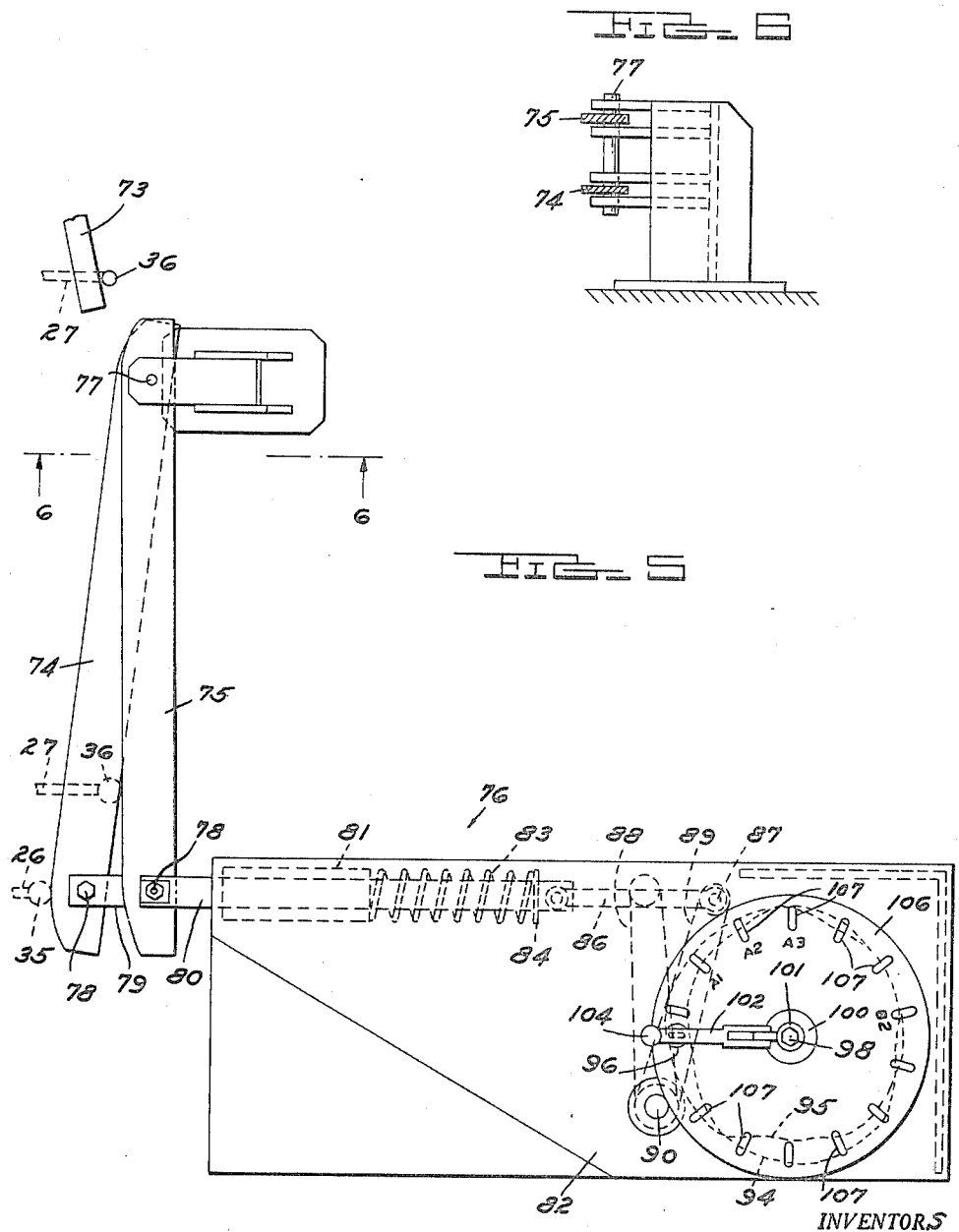

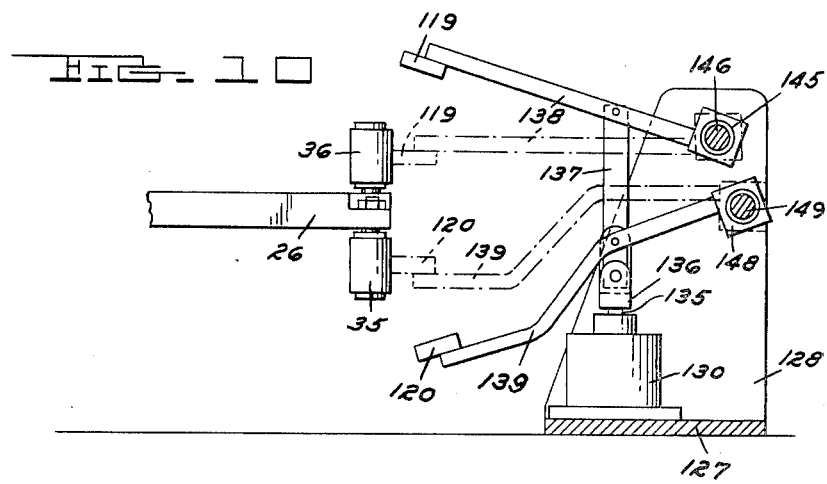
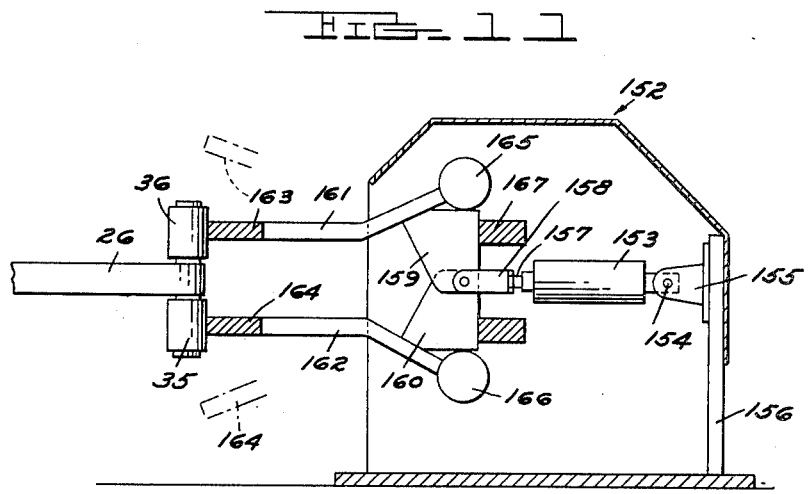

United States Patent Office 3,200,767
Patented Aug. 17, 1965

3,200,767
SIGNAL SETTING MECHANISM FOR CONVEYOR TRUCK
Paul Klamp, St. Clair Shores, and Jorgen S. Bildsoe, Royal Oak, Mich., assignors to Mechanical Handling Systems, Incorporated, Detroit, Mich., a corporation of Michigan
Continuation of application Ser. No. 818,820, June 8, 1959. This application Sept. 28, 1962, Ser. No. 226,963
16 Claims. (Cl. 104—88)

The present application is a continuation of a copending application of the present applicants, Serial No. 818,820, filed June 8, 1959, now abandoned. The present invention relates to improvements in a signal setting mechanism for floor trucks or dollies such as are propelled by a sub-floor conveyor chain along desired paths of travel in a factory, warehouse or the like, under switching signals to the sub-floor conveyor from the truck as set up on a signal unit or device of the truck by the improved mechanism of the present invention. Specifically and as herein illustrated, though not necessarily limited to such application, the mechanism of the present invention may be employed for the selective setting of the signal unit of a floor truck of the general nature of a truck such as constitutes the subject matter of Letters Patent to Paul Klamp, No. 3,015,284 of January 2, 1962.

It is an object of the present invention to provide a signal setting mechanism of the type described which, in any of its several manually or automatically operated embodiments, enables a truck signal unit, later functioning to control the switching of the truck from any one or several different floor paths to any one or more of other different floor paths, to be adjusted or set in a wide variety of conditions to encompass such diverse switch signaling functions.

More specifically, it is an object to provide a signal setting mechanism incorporating one or more pairs of movable signal setting cam units or ways, for the desired adjustment or setting of a pair of signal members on the floor truck. Each of these members is positionable in a plurality of locations relative to the other and to the truck, there being four such adjusted positions for each member in the illustrated embodiments, so that selected combinations or permutations of the individual settings of the respective members, each to later control the operation of a sub-floor switching unit, enable a large number of different switching actions to and from desired floor paths to be accomplished.

Still more specifically, it is an object of the invention to provide, for use in association with floor trucks each equipped with a pair of independently movable signaling units or devices as described, which are spaced from one another in the direction of travel of the truck, a signal setting mechanism comprising manually or automatically positionable cam or guide ways coacting with the respective members of said signal unit or device so as to position these members varyingly in a lateral direction (in reference to the direction of travel of the truck) relative to one another and to the truck. These cam or guide ways are, in one manually operated embodiment of the invention, in the form of convergent tracks into which the truck signal members are directed at an incoming end, and by which the members are shifted laterally in traversing the length of the tracks, as the latter are adjustably positioned by the mechanism.

In another embodiment of the invention, also manually settable, the guide ways are in the form of a pair of fixedly pivoted cams, along a longitudinal edge of which the respective signal members are guided and ultimately positioned as desired. In other embodiments, operated automatically under pneumatic pressure, sets or pairs of individually inclined cams are provided, in a longitudinally spaced disposition of the respective sets or pairs along the direction of travel of the floor truck. A lateral adjustment of the position of the cam members of one or both of these sets determines the degree to which the respective signal members on the truck are displaced laterally, or fail to be so displaced, thereby setting up the desired position of the truck signal members for later switch controlling action.

Yet another object is to provide a mechanism of the type described, in which the positions of the truck signal members referred to may be differently keyed or identified, as A, B, C, etc. for the positions of one, and 1, 2, 3, etc. for the positions of the other, and in which a manual or automatic operating device of the mechanism may be similarly keyed in combinations of these indicia as A-1, A-2, A-3—C-4, etc., each setting of the control device in accordance with these combinations effecting a different set relationship of the truck signal members relative to the truck and to one another, so that the mechanism may be operated readily, easily and reliably by an unskilled attendant.

It is a general object of the invention to provide, in a signaling type material transportation system, an improved combination of a traveling material supporting carrier provided with dual transversely adjustable signaling members, and signal setting means including plural cam members respectively engageable with said signaling members to adjust the position of the latter relative to one another and transversely of the direction of travel of the carrier, thereby providing a wide range of relative settings of the signaling members to control later switching and like operations performed on the carrier.

The foregoing as well as other objects will become more apparent as this description proceeds, especially when considered in connection with the accompanying drawings illustrating the invention, wherein:

FIG. 2 is a fragmentary view in front elevation of the truck, showing its tow pin as received in a floor guide slot, and of the improved manual signal setting mechanism of the first embodiment, certain cam or guide rails of the mechanism appearing in vertical transverse section, and certain bumper provisions shown in FIG. 1 being omitted so as not to obscure the remainder of the figure;

FIG. 4 is a fragmentary side elevational view showing a manually operable mechanism in accordance with another embodiment of the invention;

FIG. 5 is a top plan view of the mechanism of FIG. 4;

FIG. 6 is a view in transverse vertical section along line 6—6 of FIG. 5;

FIG. 7 is a top plan view, somewhat schematic in nature, illustrating a third alternative embodiment, as pneumatically and automatically operated, and in association with a pre-set unit and a floor truck whose signal members are set by it;

Figure 8:
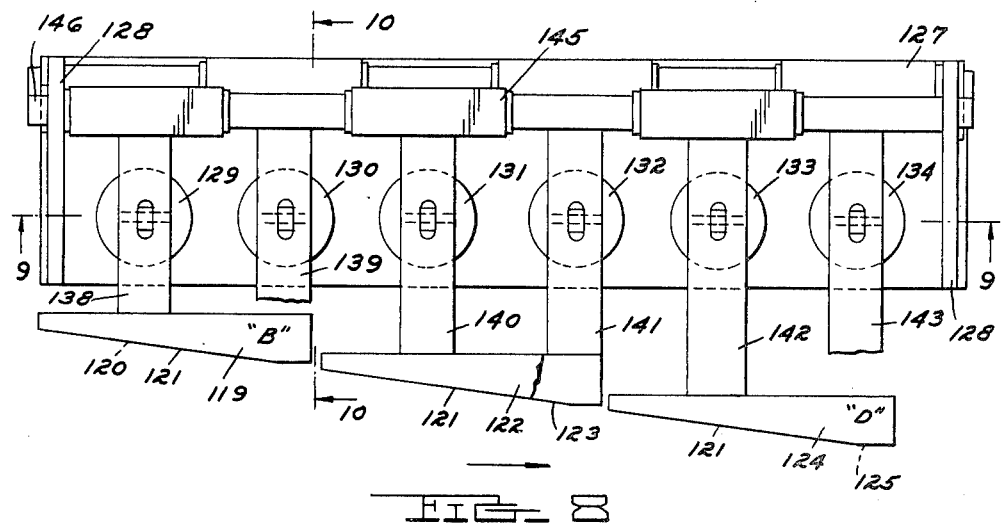
FIG. 8 is a top plan view in larger scale of the pneumatically controlled cam or guide way unit of the mechanism of FIG. 7.
Figure 9:
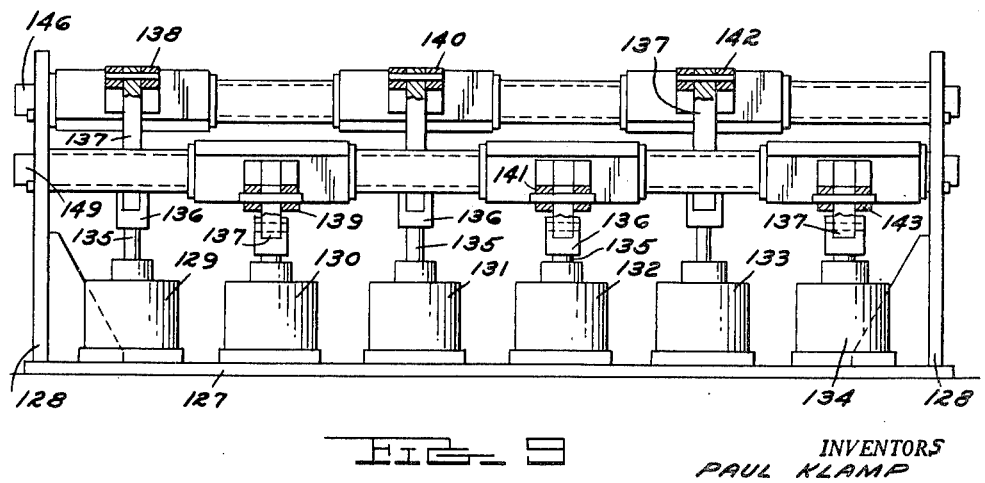

FIGS. 9 and 10 are, respectively, views in vertical cross section along lines 9—9 and 10—10 of FIG. 8, FIG. 10 indicating in solid and dotted line, respectively, the inoperative, non-setting and the operative, setting positions of a pair of the setting cams or ways of the mechanism; and FIG. 11 is a view in transverse vertical section, generally similar to FIG. 10, illustrating an alternative embodiment of automatic, pneumatic or hydraulic signal setting mechanism in accordance with the invention.

Figure 1:
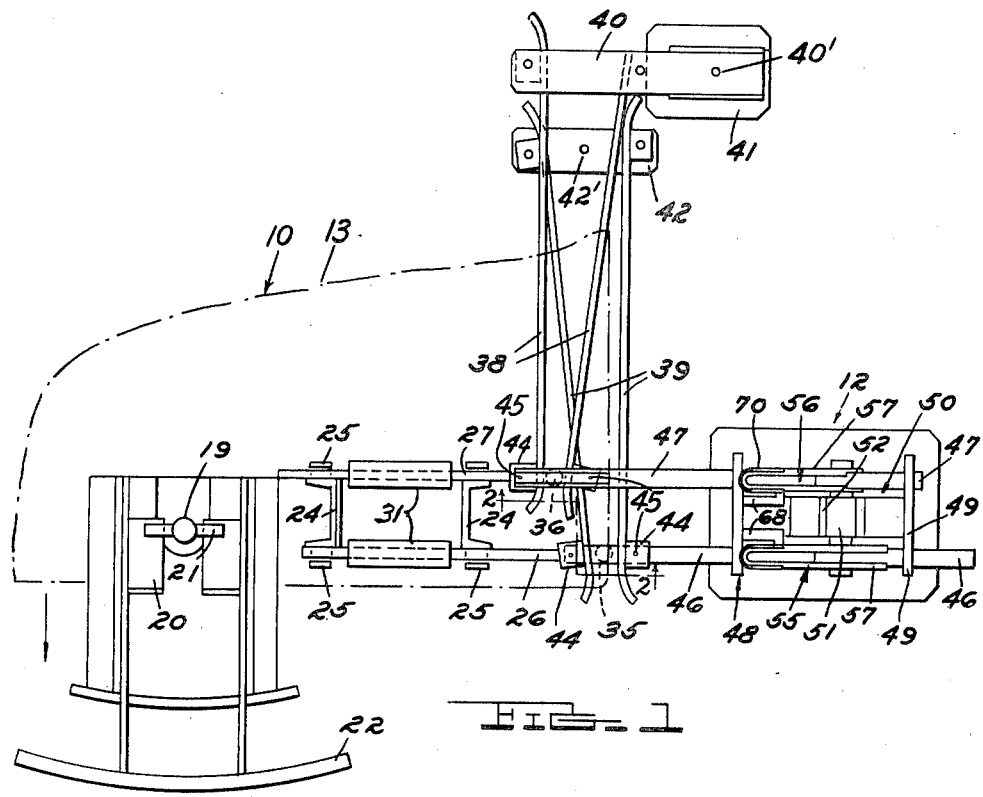
FIG. 1 is a schematic type plan view showing a conventional type of sub-floor propelled floor truck or dolly, its frame shown in dot-dash line, and one embodiment of the signal setting mechanism of the invention employed to variably adjust a signal unit or device on the truck.
Figure 3:
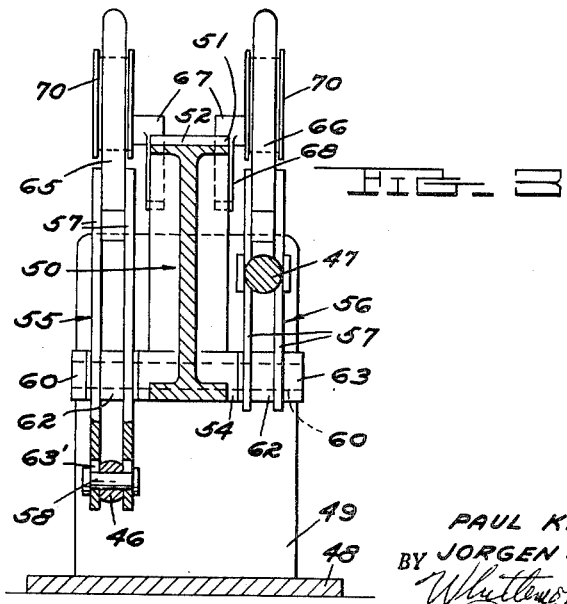
FIG. 3 is a view in enlarged scale of the mechanism, in transverse vertical section along line 3—3 of FIG. 2.

Referring first to FIGS. 1, 2 and 3, and particularly to FIG. 2, best showing the general nature of a type of floor truck 10 cntrolled by one manually operated embodiment 12 of the improved mechanism, the truck (shown in dot-dash line in FIG. 1) comprises a suitably rigid, braced frame and platform 13 mounted to run on pivoted casters 14 on a factory, warehouse or like floor surface 15. This floor is built with spaced plates 16 defining therebetween the floor slots 17 for as many different main and branch line paths of travel as it is desired that the trucks 10 be capable of traversing, the various slots 17 being, of course, in angular communication with one another at all of the desired switching points.

Truck 10 is provided with a vertically movable tow pin 19 downwardly receivable in the floor slot 17, the tow pin being mounted upon the forward end of the truck 10 by means of a suitable bracket or like framework 20, all in the manner illustrated and described in the Klamp patent identified above, to which reference may be made for additional truck details.

As herein shown, the tow pin 19 is equipped with a cross pin 21, by which it may be elevated and lowered in relation to the floor slot 17, into and out of propelled engagement by a sub-floor conveyor chain (not shown), also as illustrated and described in said Klamp patent. If desired, the tow pin 19 may have associated therewith a movable bumper 22 (FIG. 1) by which the vertical movement of the pin is effected upon engagement with the preceding truck. However, features of this sort, as illustrated and described in the identified Klamp patent, constitute no part of the present invention.

Truck 10 is fitted at its forward end, at which bumper 22 is applied, and to one side of its longitudinal center line with a pair of depending brackets or hangers 24, indicated in FIG. 1 as being constituted by opposed channels, and short lengths 25 of flat strap material (compare FIGS. 1 and 2) are bolted or otherwise secured to opposite sides of the lower ends of the respective hangers 24, coacting with the latter in providing transversely spaced guide ways, in which two laterally adjustable, elongated signal bars 26, 27 are slidably and non-rotatively received. A comparison of FIGS. 1 and 2 shows that such guide ways are of a restricted width, as compared with the vertical dimension of the bars 26, 27, so that rotation of the latter is prevented, and only longitudinal sliding motion permitted.

Thus, as indicated in FIG. 1, there are pairs of such guides 25 at both the front and the rear of the hangers 24, and the signal bars 26, 27 are adjustably slidable therein in parallel relation to one another, extending laterally or transversely outwardly of the longitudinal center line of the truck 10. As illustrated in FIG. 2, the forward bar 26 has a depending signal flag or tappet 28 fixed thereon, and the rear bar 27 carries a similar signal flag or tappet 29. These flags or tappets are for the purpose of engaging the sub-floor signal receiving and switching unit (not shown), which may be of the character illustrated and described in either the Letters Patent to Paul Klamp, No. 3,045,610 of July 24, 1962, or the Letters Patent of Paul Klamp and Robert Krammer, No. 2,965,043 of December 20, 1960, to which reference may be had for details. Their function is, upon engagement above the floor 15 by one or both of the truck signal flags 28, 29, to impart a switch operating action to one or more sub-floor switch units (not shown) and thereby condition such units for subsequent diversion of the signaling truck to one or more branch or other paths, along which the truck 10 is guided by the travel of its tow pin 19 in the floor slot 17, under propulsion by the sub-floor conveyor chain (not shown).

In the alternative, instead of mechanical signaling provisions of the general sort referred to above, the signal flags 28, 29 may find their equivalent in suitable elements coacting magnetically or otherwise with signal units set in the floor 15, such as are known to the art. As to alternatives of these different types, the present invention is not particularly concerned, but primarily deals with improved mechanisms by which the positioning of the signal flags, or other equivalents, relative to one another, and in the lateral sense relative to the truck 10, is accomplished.

In order to hold the bars 26, 27, in their adjusted positions as thus set, a hanger 24 may suitably support, above each of the signal bars 26, 27, a spring arm 31 provided at its outer end with a detent roller 32 receivable in arcuate recesses 33 formed along the upper edge of each bar, thereby releasably holding the bars fixedly in their set positions, and also exerting a force on the bars resisting lateral twist thereof. However, a positive restraint against twisting is exerted by the guide ways between straps 25 and the hangers 24, as mentioned above.

Finally, each of the signal bars 26, 27 is equipped at its outer end with an operating roller, these rollers being respectively designated 35, 36. It is seen by reference to FIG. 2 that the roller 35 is journalled on a vertical axis depending the forward signal bar 26; while the roller 36 is journalled on an upright axis to project upwardly above the other, rear signal bar 27.

In the embodiment illustrated in FIGS. 1, 2 and 3, the signal setting mechanism 12 essentially comprises upper and lower pairs of cam or guide rails 38, 38 and 39, 39, respectively. The rails of these pairs are fabricated of elongated lengths of strap metal, being in slightly convergent relation to one another, as to the component rails, in the general direction of travel of the truck 10 and the adjacent floor slot 17. The rearmost, more widely spaced ends of each pair 38, 38 and 39, 39 are mildly flared outwardly for the reception therebetween of the respective upwardly and downwardly projecting operating rollers 36, 35, respectively, of the signal bars 27, 26. The upper pairs of the rails are fixed at their rear ends to a mounting bar or strap 40, which is pivoted to swing in a horizontal plane, about an up-axis, as at 40′, by means of a suitable pivoting mount 41. The lower pair of rails 39, 39 are similarly pivoted at their rear but slightly forwardly of the mounting bar 40, as by means of a further mounting bar 42 to which the rails 39, 39 are secured to swing in a horizontal plane, about an upright axis, as at 42′, beneath the plane of swing of the rails 38, 38.

The forward ends of the respective rail pairs are mildly rounded outwardly, and in this zone each pair has a provision for swinging it in the horizontal manner described above. To this end, the respective rails of each pair may be provided, on the outer side surface, with a collar 44 welded or otherwise fixedly secured thereto; and the collars 44 may pivotally receive (with some clearance) vertically extending swiveling pins 45 on the respective lower and upper, elongated operating rods or bars 46, 47, which, as shown in FIG. 3, are of cylindrical rod section. Thus, it is seen that movement of the operating rods 46, 47 in either transverse direction, relative to a fixed frame 48 by which the rods are horizontally and slidably guided, will result in a swing of the pairs of rails 38, 39 about their respective pivoting mounts 41, 42 with resultant angular positioning of the rail pairs relative to one another. As illustrated in FIGS. 2 and 3, the frame 48 may comprise a pair of laterally spaced, plate-like uprights 49, in aligned openings 49′ of which the respective rods 46, 47 are slidably received in vertically spaced relation to one another. A flanged control or selector and locking plate 50 is bolted between the plates 49, the plate 50 being of I-beam-like cross section. It is provided with a mildly arcuate or segmental upper flange 51 in which a plurality of locating notches 52 (shown as four in the illustrated embodiment) are formed.

A boss 54 is formed on the lower portion of control or selector plate 50 to extend from either opposite side thereof, for the purpose of pivotally mounting the levers 55, 56 (FIG. 3) on either side of the plate 50, by which the lever operating rods 46, 47 are controlled. To this end, the levers 55, 56 may be in the form of transversely spaced bars 57 affording a space therebetween at which the respective rods 46, 47 are suitably journalled, as by pivot pins 58 at flats 59 formed on the opposite sides of each rod. A larger transverse pin 60 received in the plate boss 54 is pivotally connected to the respective levers 55, 56, in the case of the former, above its pivot to rod 46, and in the case of the latter below its pivot to the rod 47. Suitable spacers 62 and restraining elements 63 are applied between the lever forming bars 57 and to the pivot pin 60 to space the former and hold the levers 55, 56 in place. Slots 63' in the lower ends of the lever bars permit arcuate swing of the levers 55, 56 in imparting longitudinal motion to the respective operating rods 46, 47.

At their upper ends, the bars 57 constituting the respective operating levers 55, 56 fixedly receive therebetween the vertically upwardly projecting hand or grip pieces 65, 66, on each of which a locating pawl 67 is pivotally mounted to project inwardly and toward the selecting and holding segment 51, as shown in FIG. 3. Each pawl includes a holding finger or tooth 68 engageable in one of the segment recesses 52, these fingers being urged in a direction to engage the recesses by means of a coil spring 69 acting between the hand piece or grip 66 and a flanged member 70 secured to the pawl and embracing opposite sides of the hand piece, to which it is pivoted.

As illustrated in FIG. 2, it is desirable, for ease and convenience of operation, that the recessed selector and holding segment 51 be provided with suitable indicia as to its recesses 52 which will enable the operating levers 55, 56 to be readily positioned and held, to similarly position and hold the respective pairs of lower and upper rails 39, 38 in any desired, angularly related position of these rails. Thus, at one side surface of the segment 51 may be marked at its recesses A, B, C and D and the surface may be marked with indicia 1, 2, 3, and 4, so that with the detents 68 of the respective levers 55, 56 engaged in the recesses 52 the rail pairs 39, 38 may be seen to be set by the selected combination at any desired relative position for subsequent positioning of the signal members 26, 27, and subsequent signaling in accordance with this relative position.

The operation of the embodiment of FIGS. 1, 2 and 3 should be clear, from the foregoing description. When it is desired to alter a given position of the rail pairs the hand member 70 is merely depressed to elevate the associated detent finger or tooth 68 from the segment recess 52 and shifted to another desired position, in which it is located upon release of the member 70. As consequently positioned, the signal bar 26 or 27 is held in place by the detent roller 32 engaging one of the recesses or notches 33 in the bar under a force which, while permitting the said adjustment of the rails, will hold the bars 26, 27 and their respective signal flags 28, 29, or equivalent means, against further lateral movement until they have performed their signaling and switch actuating function. Teeth 68 also lock the rails.

FIGS. 4, 5 and 6 illustrate a further, manually operable embodiment of the invention, for the control of a truck 10 identical to that shown in FIGS. 1 and 2, hence not further illustrated save for the respective downwardly and upwardly projecting operating rollers 35, 36 of its signal bars 26, 27.

In this unit, reference being had to FIG. 5, after both of the signal bars 26, 27 have been cammed outwardly a maximum distance by engagement of their respective rollers 35, 36 with upper and lower reset cam tracks 73, the bars are then selectively positioned as desired by a pair of lower and upper control cams 74, 75, respectively, of the mechanism of this embodiment, which is generally designated 76. The rear ends of the cams are pivoted at 77 for horizontal swing in vertically spaced planes, and as optionally positioned, the rollers 35, 36 engage cams 74, 75 and are positioned thereby in their travel therealong, as indicated in dotted line sin FIG. 5.

The forward ends of the respective cams are pivotally connected at 78 to lower and upper operating rods 79, 80, respectively, which are slidably guided in vertically spaced apertures of an upright guide bracket 81 constituting a part of a fixed frame 82 immediately adjoining the cams. Rods 79, 80 are urged outwardly, in a direction away from the center line of the truck, by means of coil springs 83 which at one end abut the bracket 81 and at the other end abut a collar 84 fixed on the rod.

A clevis 85 pivotally connects the outer end of each of the rods 79, 80 with a connecting or thrust link 86; these links for the respective rods 79, 80 being pivotally connected at 87 to the upper ends of a pair of crank arms 88, 89, respectively. Crank arms 88, 89 are pivotally mounted on a common upright axis by means of a vertical pin 90 carried by the frame 82, the arms having axial hubs or bosses 91 receiving the pin, and suitable spacing means 92 being disposed axially between these bosses.

The reference numeral 94 generally designates a suitably shaped plate cam which controls the movement of the lower operating rod 79 (hence the position of the front signal bar 26) by engaging a follower roller 96 on the lower crank arm 88 between the end pivots 87, 90 of that arm. The reference numeral 95 similarly designates generally an upper, specially shaped plate cam which similarly engages a follower roller, designated 96, on the other, upper crank arm 89, thus, through upper operating rod 80, to control the positioning of the upper cam 75.

The plate cams 94, 95 are fixedly secured on an upright operating shaft 98 journalled adjacent its top and bottom by the frame 82, and appropriate spacer means 99 are interposed between the cams in question, and between the cams and frame members. Shaft 98 extends upwardly above the frame 82, through a fixed spacer or collar 100, to a convenient elevation, where it has secured thereto an operating collar 101 on which an upwardly angled lever 102 is pivotally mounted at 103, the lever 102 having an upwardly projecting hand piece or grip 104.

A fixed horizontal selecting and locking plate 106 is supported by a collar 100, this plate being provided with a multiplicity of equally spaced locating slots 107 in an annular series about its outer zone. These slots are key-coded, as in the first embodiment, to indicate a predetermined combination in accordance with the angular position of the respective plate cams 94 relative to one another, as adjustably positioned by manipulation of lever 103 to rotate the shaft 98 upon which the cams 94, 95 are fixedly secured. As thus positioned, the lever 102 is swung downwardly about its pivot 103, and a locking lug 109 on the lever is engaged in the selected slot 107.

It is to be understood that the outline of the respective cams 94, 95 (dotted line in FIG. 5) is shown arbitrarily, and with no attempt to depict with accuracy either the exact contour or the relationship of the two contours to one another. This, however, will involve simply factors of cam design and cam layout which can be readily made by those skilled in the art. Similarly, the codings shown are arbitrary and illustrative. It will be appreciated that a setup involving two sets of four key indicia each, i.e., A through D and 1 through 4, will make possible a total of sixteen distinct combinations and relative settings of the cams 74, 75 (as is also the case in reference to the rail pairs 38, 39). However, in FIG. 5 only 13 coded slots 107 are shown, since a typical installation involving the mechanism might require only 13 combinations.

In the use of the mechanism 76 of FIGS. 4, 5 and 6, with the crank arms 88, 89 adjustably positioned by appropriate rotation of the plate cams 94, 95, and with the lever 102 and shaft 98 located in adjusted position by engaging the lever lug 109 in the selected slot 107, the cams 94, 95 are locked against further rotation, the operating rods 79, 80 are positioned as desired to locate the respective bar positioning cams 74, 75, with the springs 83 urging the crank arms 88, 89 against the plate cams 94, 95 and with the cams 74, 75 thus anchored by the locked plate cams 94, 95.

FIGS. 7, 8, 9 and 10 illustrate an alternative embodiment of the signal setting mechanism, generally designated 112, which is adapted to be operated automatically, naturally under the control of an attendant, by fluid pressure, pneumatic or hydraulic. Associated with the mechanism 112 is a reset mechanism or unit 113, by which the respective signal bars 26, 27 of the truck 10, and their operating rollers 35, 36, are initially positioned fully outwardly of the truck in the lateral sense, prior to entering the control zone of the mechanism 112. A brief description of the structure of reset unit 113 is therefore in order.

It comprises a suitably fixed floor support 115 by which a pair of horizontally inclined reset cams 116 are fixedly supported in vertically spaced relation. These reset cams may be formed of lengths of angle iron, the uppermost having a downturned flange 117 adapted to be engaged beneath its horizontal flange by the upwardly journalled guide roller 36 of the rear signal bar 27, and the lowermost reset cam having a corresponding but upturned flange adapted to be rollingly engaged by the downwardly journalled operating roller 35 of the forward signal bar 26, in a manner evident from an inspection of FIG. 7 of the drawings. The reset cams 116, 116 are in vertical register with one another and mildly inclined laterally and forwardly toward the setting mechanism 112.

It will be appreciated from this that, as the truck 10 passes reset unit 113 its respective signal bars 26, 27 are drawn outwardly to their full extent, in being cammed by the respective reset members 116 in the way described. Thus, upon exiting from the cams 116, the respective operating rollers 35, 36 are in what may be considered to be an A–1 set condition, of the many combinations of roller settings which the mechanism 112 may make. If undistributed by the mechanism 112, in a neutral or A–1 setting thereof to be described, the rollers will pass the mechanism 112 in this setting, with the respective signal flags of their signal bars 26, 27 in a predetermined position to initiate a signal action or not, in accordance with the character of the sub-floor signal unit to be encountered.

The mechanism 112 comprises a plurality of vertically spaced sets or pairs of plate cam members, each member individually actuable between different vertical positions in which it is effective or ineffective on one or the other of the signal operating rollers 35, 36, under independent control of an individual fluid pressure operated device.

Thus, there are in the embodiment illustrated in FIGS. 7–10 a first set of upper and lower plate cams 119, 120 having inclined edges 121 adapted to be engaged by the respective upper and lower signal bar operating rollers 36, 35; a second pair of upper and lower cams 122, 123 of similar outline, and in similar vertical register with one another, but positioned further inwardly toward the center line of travel of the truck, and longitudinally forwardly of the first set in the direction of travel; and a third set of upper and lower plate cams 124, 125, respectively, in like vertical register and located, by provisions to be described, still further inwardly toward the center line of truck travel, and longitudinally forwardly of the second set. As appears in FIG. 8, if one or all of the six plate cams are in their operative position, as will be described, their cam edge surfaces 121 are in alignment at a predetermined angle to the path of travel of the truck 10 guided by its tow pin 19 in a floor slot 17. They are individually movable in vertical arcs to and from this position by the operating provisions to be described.

As illustrated best in FIG. 9, the reset mechanism 112 includes a suitable floor frame having a base 127 and braced end uprights 128, and a series of pneumatic cylinders are arranged in longitudinal alignment and spacing on the base 127, on which they are fixedly supported. There are six of these cylinder units, designated 129, 130, 131, 132, 133 and 134 in the embodiment illustrated, for the individual control of the six cam plates described above. Each of the cylinders has an upright plunger 135, those of the alternate cylinder units 129, 131 and 133 being of greater length than those of the other cylinders. Plungers 135 each carry a clevis 136 at its end, by which it is pivotally connected through an operating link 137 to an intermediate point on a supporting arm for one of the cams 119, 120, 122, 123, 124, 125, the respective arms, as appears in FIG. 8, being designated 138, 139, 140, 141, 142 and 143. At their outer ends they are fixedly secured to the respective cam plates of the series. At their inner ends the alternate arms 138, 140 and 142 are fixed to an elongated tubular bearing or hub member 145 to pivot them on a fixed rod or shaft 146 which is mounted at its ends in the frame plates 128. The other alternate, lower arms 139, 141 and 143 are formed in an angled outline, being similarly secured to the lower cam plates 120, 123 and 125, and having their opposite ends secured to a second elongated tubular bearing or hub 148. This bearing member is sleeved on an elongated rod or shaft 149, which, like rod 146, is carried by the frame end plates 128, but at a lower elevation.

The pneumatic cylinders 129 through 134 are, in the embodiment under consideration, of the single acting type and it is not believed that individual illustration or description of their structural details is in order, since they are commonly available articles of commerce. It suffices to state that the alternate cylinders 129, 131 and 133 which operate the respective upper cams 119, 122 and 124 upwardly and downwardly through engagement with the respective arms 138, 140 and 142 are urged downwardly by springs (not shown) within the respective cylinders 129, 131 and 133 when the application of pneumatic pressure to the cylinders is interrupted, i.e., from the solid line to the dotted line position of FIG. 10, being limited by the bottoming of their plunger 135 in the cylinder. This locks the respective arms mentioned against further counterclockwise movement about the pivot rod 146, such as would tend to result by reason of a downwardly acting force couple about the axis of the rod. The cams 119, 122 and 124 are returned upwardly to the solid line position of FIG. 10 under pneumatic pressure in the respective cylinders 129, 131 and 133.

On the other hand, the lower set of cam operating arms 139, 141 and 143 are pneumatically urged upwardly by the respective air cylinders 130, 132 and 134, being held in the operative dotted line position of FIG. 10 at the end of their pressure stroke against movement under a similar force couple about the axis of their pivot rod 149. They are spring urged downwardly to the inoperative, solid line position.

Therefore, assuming that a so-called A position of one of the signal bar operating rollers 35 or 36 is established as that roller leaves the reset unit 113 in a fully out-drawn position, and that a corresponding 1 position of the other roller is similarly established as it enters the zone of reset mechanism 112, it may be seen that the first fluid pressure cylinder 129 is operable, under suitable pneumatic valving control of a sort well known in the art, to move the first upper cam plate 119 vertically in an arc to and from a horizontal position which may be designated as B setting; while corresponding operation of the first, lower cam plate 120 by the cylinder 130 positions it in and out of what may be termed a 2 position. Similar operation of the respective pairs of cams 122, 123 and 124, 125, respectively, set the same in or remove the same from so-called, C and D positions and 3 and 4 positions. As indicated above, with the upper cams 119, 122 and 124 elevated to the solid line position of FIG. 10, or with the lower cams 120, 123 and 125 depressed to the solid line position, the respective signal bar operating rollers 36, 35 will progress undisturbed through the mechanism 112.

It is seen from the above that an operator positioned at a suitable control point and attending an appropriate push button keyboard may set the mechanism 112 for a large number of combinations, as in the preceding embodiments. In order to avoid the possibility of jamming, it is desirable that the operator first manipulate the keyboard to make the desired selection of settings of the respective upper and lower cams, and then push a final or "all clear" button to operate the pneumatic controls for the cylinders in operation. Features of such a control arrangement constitute no part of the present invention. However, an arrangement may be made whereby, if the "all clear" button is pushed too late, a suitable limit switch (not shown) operated by the truck tow pin 19 will operate to lock out the operation of all of the setting cylinders 129–134, enabling both of the signal bars 26, 27 and their operating rollers 35, 36 to pass through the mechanism 112 in a retracted, so-called A–1 position.

FIG. 11 of the drawings illustrates a further alternative form of fluid pressure operated signal setting mechanism, generally designated 152, which operates on the general principle of the form of FIGS. 7 through 10, save for the fact that it employs double acting pneumatic cylinders 153.

As longitudinally spaced, all such cylinders are pivotally mounted at 154 on bracket means 155 carried by the floor frame 156, and the plungers 157 of these cylinders are pivotally connected by clevises 158 to plates 159, 160 fixed on the respective operating arms 161, 162 of the upper and lower cam plates 163, 164, similar to the plates 119–125, and similarly arranged in pairs. The arms 161, 162 are suitably pivoted on the frame, as by elongated parallel shafts 165, 166, and upper and lower fixed abutments 167 limit the motion of these arms, by engaging the respective plates 159, 160 when the cams 163, 164 are in their operated and operative positions shown in solid line in FIG. 11. Their inoperative positions are indicated in dotted line. The operation of the embodiment of FIG. 11 is otherwise in all respects the same as that of FIGS. 7 through 10.

It is seen that the invention affords various embodiments of manually and automatically controlled signal setting mechanism by which various forms of truck borne signal units, preferably characterized by individually settable signal members to encompass a wide number of possible combinations of setting, may be readily and quickly effected. No particular skill on the part of the attendant is required, and the operation is reliable, in any of the forms.

What we claim as our invention is:

1. A signaling type material transporting system, comprising a traveling material supporting carrier having an elongated, upright propelled member adapted for propulsion by a conveyor, and a plurality of signaling members mounted for bodily movement on said carrier transversely of said propelled member and the direction of travel of the carrier, said signaling members being in non-rotative relation to the carrier, and a mechanism for variably positioning said signaling members relative to one another, as well as transversely relative to said propelled member and carrier travel direction, said mechanism comprising at least two cam members supported adjacent the path of carrier travel, and means operatively connected to said cam members for variably positioning the same for engagement by the respective signaling members to cammingly shift the latter variably relative to one another and to said propelled member and travel direction, as described.

2. A signaling type material transporting system, comprising a traveling material supporting carrier having an elongated, upright propelled member adapted for propulsion by a conveyor, and a plurality of elongated parallel, rod-like signaling members mounted for bodily movement on said carrier in the direction of the length of said members, and transversely of said propelling member and the direction of travel of the carrier, said signaling members being in non-rotative relation to the carrier, each of said signaling members having means through which said bodily movement is imparted thereto, said signaling members being positioned on said carrier in spaced front-to-rear relation to one another in a predetermined plane and in reference to the direction of travel of said carrier, said respective means projecting in opposite directions from said plane; and a mechanism for variably positioning said signaling members relative to one another, as well as transversely relative to said carrier, said mechanism comprising at least two cam members supported adjacent the path of carrier travel, and means operatively connected to said cam members for variably positioning the same for engagement by said means on the respective signaling members to cammingly shift the latter variably relative to one another and to said propelled member and travel direction, as described.

3. A signaling type material transporting system, comprising a traveling material supporting carrier having an elongated, upright propelled member adapted for propulsion by a conveyor, and a plurality of signaling members mounted for bodily movement on said carrier transversely of said propelled member and the direction of travel of the carrier, said signaling members being in non-rotative relation to the carrier, and a mechanism for variably positioning said signaling members relative to one another, as well as transversely relative to said propelled member and carrier travel direction, said mechanism comprising at least two cam members supported adjacent the path of carrier travel, and means operatively connected to said cam members for variably positioning the same for engagement by the respective signaling members to cammingly shift the latter variably relative to one another and to said propelled member and travel direction, as described, said cam members each being mounted for swinging movement by said positioning means relative to the carrier path in thus positioning the cam members.

4. A signaling type material transporting system, comprising a traveling material supporting carrier having an elongated, upright propelled member adapted for propulsion by a conveyor, and a plurality of signaling members mounted for bodily movement on said carrier transversely of said propelled member and the direction of travel of the carrier, said signaling members being in non-rotative relation to the carrier, and a mechanism for variably positioning said signaling members relative to one another, as well as transversely relative to said propelled member and carrier travel direction, said mechanism comprising at least two cam members supported adjacent the path of carrier travel, and means operatively connected to said cam members for variably positioning the same for engagement by the respective signaling members to cammingly shift the latter variably relative to one another and to said propelled member and travel direction, as described, said cam members each being mounted for swinging movement by said positioning means relative to the carrier path and in a plane paralleling the direction of bodily movement of said signaling members in thus positioning the cam members.

5. A signaling type material transporting system, comprising a traveling material supporting carrier having an elongated, upright propelled member adapted for propulsion by a conveyor, and a plurality of signaling members mounted for bodily movement on said carrier transversely of said propelled member and the direction of travel of the carrier, said signaling members being in non-rotative relation to the carrier, and a mechanism for variably positioning said signaling members relative to one another, as well as transversely relative to said propelled member and carrier travel direction, said mechanism comprising at least two cam members supported adjacent the path of carrier travel, and means operatively connected to said cam members for variably positioning the same for engagement by the respective signaling members to cammingly shift the latter variably relative to one another and the said propelled member and travel direction, as described, said cam members each being mounted for swinging movement by said positioning means relative to the carrier path and transversely of the path of carrier travel in thus positioning the cam members.

6. A signaling type material transporting system, comprising a traveling material supporting carrier having an elongated, upright propelled member adapted for propulsion by a conveyor, and a plurality of elongated parallel, rod-like signaling members mounted for bodily movement on said carrier in the direction of the length of said signaling members, and transversely of said propelled member and the direction of travel of the carrier, said signaling members being in non-rotative relation to the carrier, each of said signaling members having means through which said bodily movement is imparted thereto, said signaling members being positioned on said carrier in spaced front-to-rear relation to one another in a predetermined plane and in reference to the direction of travel of said carrier, said respective means projecting in opposite directions from said plane; and a mechanism for variably positioning said signaling members relative to one another, as well as transversely relative to said propelled member and carrier travel direction, said mechanism comprising at least two cam members supported adjacent the path of carrier travel, and means operatively connected to said cam members for variably positioning the same for engagement by said means on the respective signaling members to cammingly shift the latter variably relative to one another and to said propelled member and travel direction, as described, said cam members each being mounted for swinging movement by said positioning means relative to the carrier path in thus positioning the cam members.

7. A signaling type material transporting system, comprising a traveling material supporting carrier having an elongated, upright propelled member adapted for propulsion by a conveyor, and a plurality of signaling members mounted for bodily movement on said carrier transversely of said propelled member and the direction of travel of the carrier, said signaling members being in non-rotative relation to the carrier, and a mechanism for variably positioning said members relative to one another, as well as transversely relative to said propelled member and carrier travel direction, said mechanism comprising at least two cam members supported adjacent the path of carrier travel, and means operatively connected to said cam members for variably positioning the same for engagement by the respective signaling members to cammingly shift the latter variably relative to one another and to said propelled member and travel direction, as described, said respective cam members being mounted in spaced relation to one another in the direction of travel of said carrier and being moved by said positioning means into and out of a position in coplanar relation to said signaling members, in which coplanar position said cam members are at different distances transversely outwardly of the center line of the travel path of the carrier.

8. A signaling type material transporting system, comprising a traveling material supporting carrier having an elongated, upright propelled member adapted for propulsion by a conveyor, and a plurality of elongated parallel, rod-like signaling members mounted for bodily movement on said carrier in the direction of the length of said signaling members, and transversely of said propelled member and the direction of travel of the carrier, said signaling members being in non-rotative relation to the carrier, each of said signaling members having means through which said bodily movement is imparted thereto, said signaling members being positioned on said carrier in spaced front-to-rear relation to one another in a predetermined plane and in reference to the direction of travel of said carrier, said respective means projecting in opposite directions from said plane; and a mechanism for variably positioning said members relative to one another, as well as transversely relative to said propelled member and carrier travel direction, said mechanism comprising at least two cam members supported adjacent the path of carrier travel, and means operatively connected to said cam members for variably positioning the same for engagement by said means on the respective signaling members to cammingly shift the latter variably relative to one another and to said propelled member and travel direction, as described, said respective cam members being mounted in spaced relation to one another in the direction of travel of said carrier and being moved by said positioning means into and out of a position in coplanar relation to said respective means of said signaling members, in which coplanar postion said cam members are at different distances transversely outwardly of the center line of the travel path of the carrier.

9. A signaling type material transporting system, comprising a traveling material supporting carrier having wheels sustaining the same for movement on a horizontal support, an upright member adapted to project through a slot in said support and engageable by propelling means acting beneath said support to propel the carrier, and a plurality of elongated parallel, rod-like signaling members mounted on said carrier for horizontal bodily movement thereon in the direction of the length of said signaling members and transversely of said propelled member and the direction of travel of the carrier, said signaling members being in non-rotative relation to the carrier, each of said signaling members having means thereon through which said bodily movement is imparted thereto, said signaling members being positioned on said carrier in spaced front-to-rear relation to one another in a predetermined horizontal plane and in reference to the direction of travel of said carrier, said respective means projecting in opposite vertical directions from said plane; and a mechanism for variably positioning said signaling members relative to one another, as well as transversely relative to said propelled member and travel direction, said mechanism comprising at least two cam members supported adjacent the path of carrier travel, and means operatively connected to said cam members for variably positioning the same for engagement by said means on the respective signaling members to cammingly shift the latter variably in the direction of the length thereof and relative to one another and to said propelled member and travel direction, as described.

10. A signaling type material transporting system, comprising a wheeled truck to support a load from above for travel on a floor, said truck having an elongated, vertical propelled member engageable for propulsion by a conveyor, and a signalling member mounted for horizontal bodily movement on said truck transversely of said propelled member and the direction of travel of the truck, said signaling member being in non-rotative relation to the truck, and a mechanism for shifting and positioning said signaling member horizontally and transversely relative to said propelled member and truck travel direction, said mechanism comprising a cam member supported adjacent the path of truck travel, and means operatively connected to said cam member for adjustably positioning the same for engagement by the signaling member to cammingly shift the latter as described.

11. A signaling type material transporting system, comprising a wheeled truck to support a load from above for travel on a floor, said truck having an elongated, vertical propelled member engageable for propulsion by a conveyor, and a signaling member mounted directly on said truck for horizontal bodily movement transversely of said propelled member and the direction of travel of the truck, said signaling member being in non-rotative relation to the truck, and a mechanism for shifting and positioning said signaling member horizontally and transversely relative to said propelled member and truck travel direction, said mechanism comprising a cam member supported adjacent the path of truck travel, and means operatively connected to said cam member for adjustably positioning the same for engagement by the signaling member to cammingly shift the latter, as described, said cam member being mounted for swinging movement by said positioning means in thus positioning the cam member.

12. A signaling type material transporting system, comprising a wheeled truck to support a load from above for travel on a floor, said truck having an elongated, vertical propelled member engageable for propulsion by a conveyor, and a signaling member mounted directly on said truck for horizontal bodily movement transversely of said propelled member and the direction of travel of the truck, said signaling member being in non-rotative relation to the truck, and a mechanism for shifting and positioning said signaling member horizontally and transversely relative to said propelled member and truck travel direction, said mechanism comprising a cam member supported adjacent the path of truck travel, and means operatively connected to said cam member for adjustably positioning the same for engagement by the signaling member to cammingly shift the latter, as described, said cam member being mounted for swinging movement by said positioning means in a horizontal plane in thus positioning the cam member.

13. A signaling type material transporting system, comprising a wheeled truck to support a load from above for travel on a floor, said truck having an elongated, vertical propelled member engageable for propulsion by a conveyor, and a signaling member mounted directly on said truck for horizontal bodily movement transversely of said propelled member and the direction of travel of the truck, said signaling member being in non-rotative relation to the truck, and a mechanism for shifting and positioning said signaling member horizontally and transversely relative to said propelled member and truck travel direction, said mechanism comprising a cam member supported adjacent the path of truck travel, and means operatively connected to said cam member for adjustably positioning the same for engagement by the signaling member to cammingly shift the latter, as described, said cam member being mounted for swinging movement by said positioning means in a vertical plane in thus positioning the cam member.

14. A signaling type material transporting system, comprising a wheeled truck to support a load from above for travel on a floor, said truck having an elongated, vertical propelled member engageable for propulsion by a conveyor, and a signaling member mounted directly on said truck for horizontal bodily movement transversely of said propelled member and the direction of travel of the truck, said signaling member being in non-rotative relation to the truck and having parts projecting in opposite vertical directions therefrom, and a mechanism for adjustably shifting and positioning said signaling member horizontally and transversely relative to said propelled member and truck travel direction, said mechanism comprising cam means supported adjacent the path of truck travel, and means operatively connected to said cam means for adjustably positioning the same for selective engagement therewith by said respective parts of said signaling member to cammingly shift the latter, as described.

15. A signaling type material transporting system, comprising a wheeled truck to support a load from above for travel on a floor, said truck having an elongated, vertical propelled member engageable for propulsion by a conveyor, and a signaling member mounted directly on said truck for horizontal bodily movement transversely of said propelled member and the direction of travel of the truck, said signaling member being in non-rotative relation to the truck and having parts projecting in opposite vertical directions therefrom, and a mechanism for adjustably shifting and positioning said signaling member horizontally and transversely relative to said propelled member and truck travel direction, said mechanism comprising cam means supported adjacent the path of truck travel, and means operatively connected to said cam means for adjustably positioning the same for selective engagement therewith by said respective parts of said signaling member to cammingly shift the latter, as described, said cam means being mounted for swinging movement by said positioning means in thus positioning the cam means.

16. A signaling type material transporting system, comprising a wheeled truck to support a load from above for travel on a floor, said truck having an upright tow pin adapted to project through a slot in the floor for engagement by propelling means acting beneath said floor, and an elongated rod-like signaling member mounted directly on said truck for horizontal bodily movement thereon in the direction of the length of said signaling member and transversely of said upright tow pin and the direction of travel of the truck, said signalling member being in non-rotative relation to the truck, said signaling member being positioned on said truck in a predetermined horizontal plane in reference to the direction of travel of said carrier, said signaling member having parts thereon projecting in opposite vertical directions from said plane by which said bodily movement is imparted thereto; and a mechanism for adjustably positioning said signaling member transversely relative to said propelled member and travel direction, said mechanism comprising at least two cam members supported adjacent the path of carrier travel, and means operatively connected to said cam members for variably positioning the same for selective engagement by said parts on the signaling member to cammingly shift and adjust the latter, as described.

References Cited by the Examiner
UNITED STATES PATENTS
3,015,284    1/62    Klamp _____ 104—172 X
FOREIGN PATENTS
584,274    1/47    Great Britain.

EUGENE G. BOTZ, *Primary Examiner.*
LEO QUACKENBUSH, *Examiner.*